J. DE BARROS.
NUT MARKING MACHINE.
APPLICATION FILED MAY 16, 1919.
1,339,881.
Patented May 11, 1920.
2 SHEETS—SHEET 1.
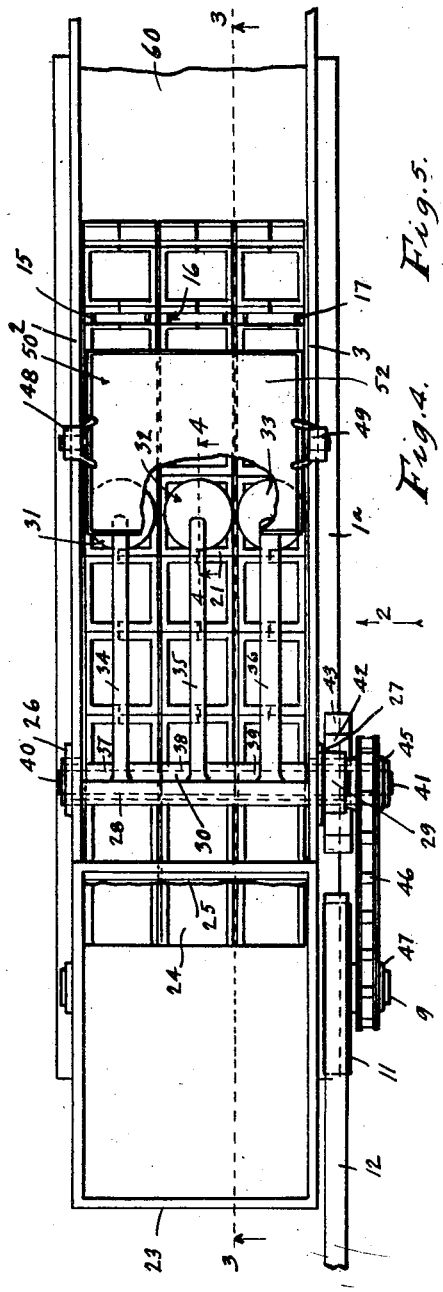
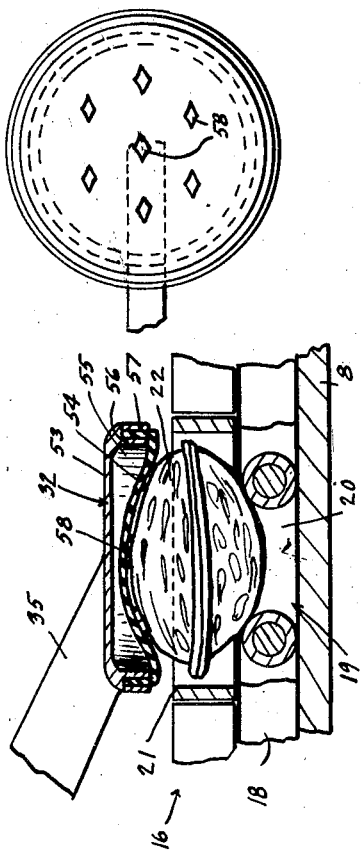
INVENTOR.
Jose de Barros.
BY
ATTORNEYS.

J. DE BARROS.
NUT MARKING MACHINE.
APPLICATION FILED MAY 16, 1919.
1,339,881.
Patented May 11, 1920.
2 SHEETS—SHEET 2.
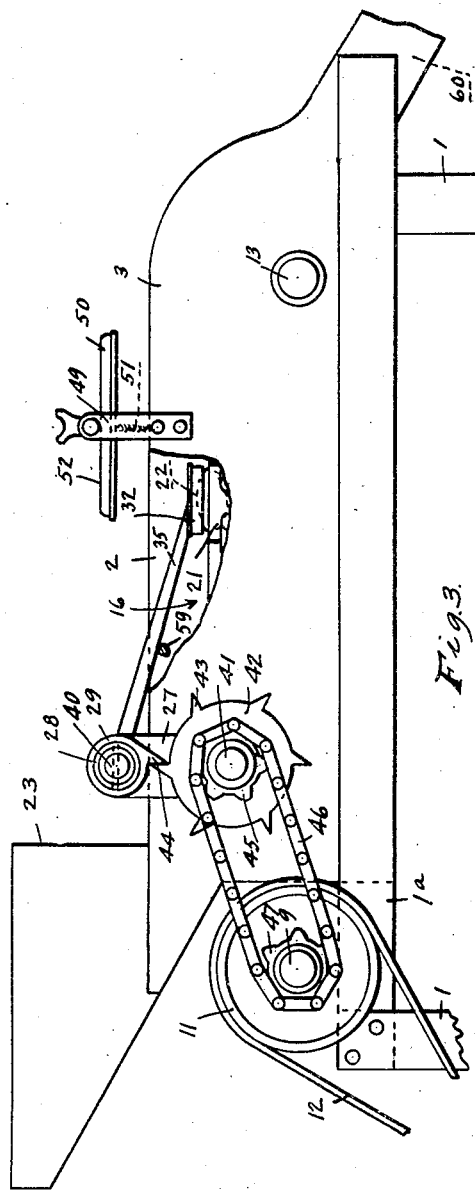
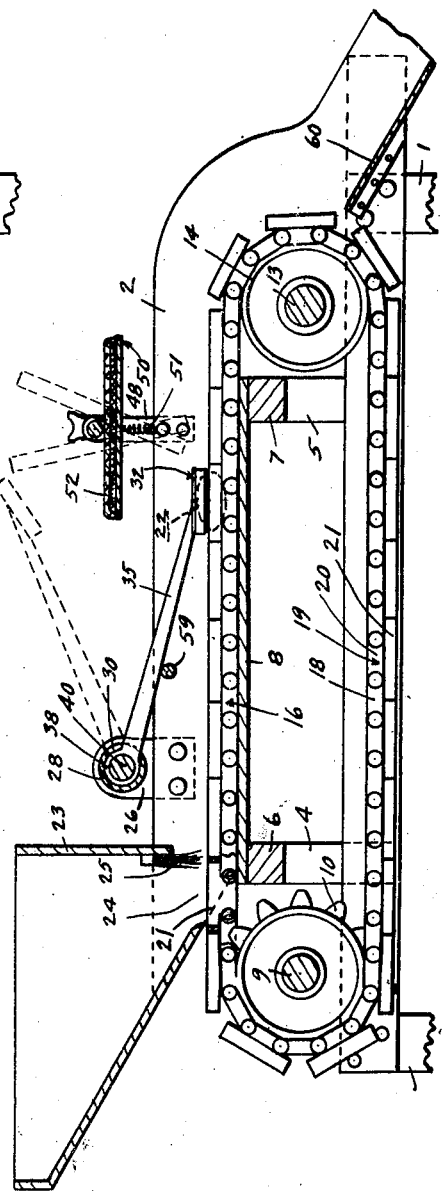
INVENTOR.
Jose de Barros,
BY
Hazard & Miller
ATTORNEYS.

UNITED STATES PATENT OFFICE.

JOSE DE BARROS, OF IMPERIAL, CALIFORNIA.

NUT-MARKING MACHINE.

1,339,881. Specification of Letters Patent. Patented May 11, 1920.

Application filed May 16, 1919. Serial No. 297,641.

*To all whom it may concern:*

Be it known that I, JOSE DE BARROS, a citizen of the United States, residing at Imperial, in the county of Imperial and State of California, have invented new and useful Improvements in Nut-Marking Machines, of which the following is a specification.

My object is to make a nut marking machine, and my invention consists of the novel features herein shown, described and claimed.

Figure 1 is a top plan view of a nut marking machine embodying the principles of my invention, parts being broken away to show the construction.

Fig. 2 is a side elevation looking in the direction indicated by the arrow 2 in Fig. 1, parts being broken away and shown in section.

Fig. 3 is a sectional elevation on a plane parallel with Fig. 2 and substantially on the line 3—3 of Fig. 1, and looking in the direction indicated by the arrow.

Fig. 4 is an enlarged vertical cross section on the line 4—4 of Fig. 1.

Fig. 5 is a bottom plan view of one of the marking elements.

Four posts 1 are rigidly mounted, and the main frame is built upon the upper ends of these posts, said frame consisting principally of the side sills 1ª mounted horizontally in parallel positions, side pieces 2 and 3 extending upwardly from the side sills 1ª, secondary posts 4 and 5 extending upwardly from the side sills 1ª, crosspieces 6 and 7 connecting the upper ends of the secondary posts 4 and 5 crosswise, and the platform 8 mounted upon the crosspieces 6 and 7 between the side pieces 2 and 3. A driving shaft 9 is mounted in the bearings in the side pieces 2 and 3 and sprockets 10 are fixed upon the driving shaft 9. A belt wheel 11 is fixed upon one end of the driving shaft 9 and the belt 12 connects the belt wheel 11 to a motor or any suitable source of power not shown. An idler shaft 13 is mounted in bearings in the side pieces 2 and 3 and idler wheels 14 are fixed upon the shaft 13 in line with the sprockets 10.

Sprocket chains 15, 16 and 17 are mounted upon the sprockets 10 and idlers 14, the upper sides of the chains running upon the platform 8. Each chain 15, 16 and 17 is made up of chain links 18 and nut carriers 19 arranged alternately, each nut carrier having a base 20 occupying the space of a link in the chain and a box 21 rigid with the base and overlapping the adjacent links half way both ways, and each box being adapted to receive and carry a nut 22. A hopper 23 is mounted with its lower end between the side pieces 2 and 3 and extends upwardly at the upper end of the machine, the discharge opening 24 of the hopper being directly above the forward end of the platform 8, so that when nuts are dumped in the hopper they will feed through the opening 24 to the nut carriers 19. A brush 25 is mounted at the rear side of the opening 24 to assist in feeding the nuts one at a time to a chain. Bearings 26 and 27 extend upwardly from the side pieces 2 and 3.

A tubular rock shaft 28 is mounted in the bearings 26 and 27 and a cam 29 is fixed upon one end of the rock shaft. The rock shaft 28 has a slot 30 throughout the length between the side pieces 2 and 3.

The marker elements 31, 32 and 33 are fixed upon arms 34, 35 and 36, and bearing heads 37, 38 and 39 are formed integral with the opposite ends of the arms 34, 35 and 36 from the marker elements 31, 32 and 33, and said heads 37, 38 and 39 fit in the slot 30, and a pivot shaft 40 is inserted through the heads, the ends of the pivot shaft 40 being fixed to the ends of the rock shaft 28 so as to hold the pivot shaft in place. The slot 30 is wide enough to allow the arms 34, 35 and 36 to vibrate up and down as shown in dotted lines in Fig. 3.

A stub shaft 41 extends outwardly from the side piece 3 and an operating cam 42 is rotatably mounted upon the stub shaft, said cam 42 having teeth 43 to engage the tooth 44 of the cam 29. A sprocket 45 is mounted upon the shaft 41 and fixed to the cam 42, and a chain 46 connects the sprocket 45 to a sprocket 47 fixed upon the driving shaft 9, so that as the driving shaft 9 is operated the cam 42 is rotated and the arms 34, 35 and 36 carrying the markers 31, 32 and 33 are vibrated up and down once for each time a tooth 43 passes a tooth 44, and the parts are timed so that the markers will go up and down fast enough to mark each walnut carried by the chains 15, 16 and 17.

Posts 48 and 49 extend upwardly from the side pieces 2 and 3 behind the marker elements 31, 32 and 33. An ink pad 50 is pivotally mounted between the posts, a spring 51 connects the ink pad to the frame, the tension of the spring 50 being exerted to hold the ink pad 50 normally in a horizontal position with the inking face 52 upwardly. The ink pad 50 is in position to be engaged by the marker elements 31, 32 and 33, as they pass upwardly, thereby swinging the ink pad, as shown in dotted lines in Fig. 3, and the markers pass upwardly beyond the range of the ink pad, so that the ink pad will return to its normal position, and when the markers come down the faces of the markers will strike the inking face 52 and then pass downwardly and strike the nuts. The marker elements 31, 32 and 33 are substantially alike and are constructed as shown in Figs. 4 and 5.

The heads 53 are disk-shaped and hollow, and the rubber faces 54 are stretched across the hollow 55 and drawn over the rim 56 of the head and held in place by a ring 57. The rubber faces 54 have printing characters 58 upon their lower faces to receive ink from the ink pad. The rubber faces are elastic, so that when the markers fall down upon the nuts 22 they will yield to the contour of the nuts and print one or more of the characters 58 upon the nuts.

A stop bar 59 is mounted across the side pieces 2 and 3 to limit the downward movement of the arms 34, 35 and 36 and to hold the markers from striking the box 21 when there is no nut in place to be marked. A chute 60 is mounted behind the machine to receive the nuts from the markers.

While the marker is primarily intended for marking English walnuts it is obvious that it may be used for marking any kind of nuts and for marking lemons, oranges, and the like.

Various changes may be made without departing from the spirit of my invention as claimed.

I claim:

1. In a nut marker, in combination, a driving shaft, a conveyer having means for carrying the nuts individually, means for feeding the nuts to the conveyer, a marking arm carried upon a rocking shaft above the conveyer, a cam fixed to the rocking shaft, a spiked wheel rotatably mounted and positioned to engage with its spikes the cam of the rocking shaft, means for rotating the spiked wheel, an elastic marker mounted on the end of the marking arm having characters mounted upon a yieldable base whereby the marker may conform to the uneven periphery of the nut and a pivotally mounted inking pad adapted and positioned to be struck by and feed ink to the characters of the yieldable marker as the marking arm descends to mark the nut.

2. In a nut marker in combination a driving shaft, a conveyer having means for carrying the nuts individually, means for feeding the nuts to the conveyer, an intermittently operated marking arm, an elastic marker mounted on the end of the marking arm having characters mounted upon a yieldable base so that the marker may conform to the uneven periphery of the nut and a pivotally mounted inking pad adapted and positioned to be struck by and feed ink to the characters of the yieldable marker as the marking arm descends to mark the nut.

3. In a nut marker, in combination, means for carrying the nuts to be marked, a pivotally mounted marking arm, a marker positioned at the end of the arm, and a pivotally mounted inking pad adapted and positioned to be struck by and feed ink to the marker of the marking arm as the arm descends to imprint the mark of the marker on the nuts.

In testimony whereof I have signed my name to this specification.

JOSE DE BARROS.